(12) United States Patent
Lee

(10) Patent No.: US 9,352,433 B2
(45) Date of Patent: May 31, 2016

(54) TOOL CARRIER FOR AN AUTOMATIC TOOL CHANGER

(75) Inventor: Dong Eun Lee, Gyeongsangnam-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 506 days.

(21) Appl. No.: 13/880,123

(22) PCT Filed: Oct. 18, 2011

(86) PCT No.: PCT/KR2011/007731
§ 371 (c)(1),
(2), (4) Date: Apr. 18, 2013

(87) PCT Pub. No.: WO2012/053793
PCT Pub. Date: Apr. 26, 2012

(65) Prior Publication Data
US 2013/0217553 A1     Aug. 22, 2013

(30) Foreign Application Priority Data

Oct. 18, 2010   (KR) .......................... 10-2010-0101179

(51) Int. Cl.
*B23Q 3/157*     (2006.01)
*B23Q 3/155*     (2006.01)

(52) U.S. Cl.
CPC .......... *B23Q 3/15513* (2013.01); *B23Q 3/1554* (2013.01); *B23Q 3/15713* (2013.01);
(Continued)

(58) Field of Classification Search
CPC ........... B23Q 3/15746; B23Q 3/15773; Y10T 483/1743; Y10T 483/1745; Y10T 483/1752; Y10T 483/1774; Y10T 483/1776; Y10T 483/1836

USPC .............................. 483/34, 35, 38, 47, 50, 62
See application file for complete search history.

(56) References Cited

U.S. PATENT DOCUMENTS

| 3,990,140 A | 11/1976 | Polacek et al. |
| 4,020,545 A | 5/1977 | Slavinski et al. |

(Continued)

FOREIGN PATENT DOCUMENTS

| CN | 2214260 Y | 12/1995 |
| JP | 63267136 A | * 11/1988 |

(Continued)

OTHER PUBLICATIONS

JPO Machine Translation of JP10094933A—Komoda, Daisuke, "Tool Changer," Apr. 14, 1998.*

(Continued)

*Primary Examiner* — Erica E Cadugan
*Assistant Examiner* — Michael Vitale
(74) *Attorney, Agent, or Firm* — John D. Veldhuis-Kroeze; Westman, Champlin & Koehler, P.A.

(57) ABSTRACT

The present disclosure relates to a tool carrier for an automatic tool changer. A tool carrier for an automatic tool changer according to the present disclosure includes: a base plate at which a center shaft is installed; a carrier unit installed at the center shaft to turn around the center shaft; a rotating pocket unit installed at the carrier unit to rotate and having a pin installed to protrude outward; a first cam block installed at the base plate and configured to perform a cam action with the pin to allow the pocket unit to rotate when the carrier unit turns from an initial position to the target position; and a second cam block installed at the base plate and configured to perform a cam action with the pin to allow the pocket unit to rotate when the carrier unit turns from the target position to the initial position.

3 Claims, 6 Drawing Sheets

(52) U.S. Cl.
CPC ....... *B23Q3/15746* (2013.01); *Y10T 483/1752* (2015.01); *Y10T 483/1776* (2015.01); *Y10T 483/18* (2015.01); *Y10T 483/1836* (2015.01)

(56) References Cited

U.S. PATENT DOCUMENTS

| | | | | |
|---|---|---|---|---|
| 4,091,526 | A | * | 5/1978 | Nakaso ................ B23Q 3/1554 483/35 |
| 4,459,737 | A | * | 7/1984 | Mori ................... B23Q 3/1574 414/590 |
| 4,520,550 | A | * | 6/1985 | Dunn ................... B23B 31/113 403/349 |
| 4,932,118 | A | * | 6/1990 | Winkler ............. B23Q 3/15713 483/48 |
| 5,554,087 | A | * | 9/1996 | Hwang ................ B23Q 3/1554 483/62 |
| 6,802,801 | B2 | * | 10/2004 | Lasch ................. B23Q 3/1554 483/40 |

FOREIGN PATENT DOCUMENTS

| | | |
|---|---|---|
| JP | 06-047644 A | 2/1994 |
| JP | 10-094933 A | 4/1998 |
| KR | 20-1995-0005791 Y1 | 7/1995 |
| KR | 1020040045223 A | 6/2004 |
| KR | 10-0465425 B1 | 1/2005 |

OTHER PUBLICATIONS

Chinese Office Action dated Oct. 29, 2014 for corresponding Chinese Application No. 201180050061.3, 5 pages.
Search Report dated May 3, 2012 and written in Korean with English translation attached for International Application No. PCT/KR2011/007731 filed Oct. 18, 2011, 5 pages.

* cited by examiner

[a]

[b]

TOOL CARRIER FOR AN AUTOMATIC TOOL CHANGER

CROSS-REFERENCE TO RELATED APPLICATION

This application is a Section 371 National Stage Application of International Application No. PCT/KR2011/007731, filed Oct. 18, 2011 and published, not in English, as WO2012/053793 on Apr. 26, 2012.

FIELD OF THE DISCLOSURE

The present disclosure relates to a tool carrier for an automatic tool changer, and more particularly, to a tool carrier for an automatic tool changer, which is disposed between a tool magazine and the automatic tool changer to carry a tool.

BACKGROUND OF THE DISCLOSURE

In general, a numerical controlled machine tool accommodates a number of tools, performs a cutting processing by calling a particular tool, and accommodates again the tool after completing using the tool. Here, the tool is accommodated in a tool magazine, and the tool is carried between the tool magazine and a spindle by an automatic tool changer (ATC).

Meanwhile, key blocks are disposed at the tool pocket of the tool magazine and the spindle, and key grooves, which accommodate the aforementioned key blocks, are formed at all tools, and therefore when the tool is mounted at the tool pocket or the spindle, the tool is aligned in a particular direction in which the key block and the key groove are fitted with each other.

In addition, in a case in which a shape of the tool is asymmetric based on an axis line or the tool has a large diameter, of which a radius of rotation is large, the tool may not be smoothly accommodated in the tool magazine, and may interfere with the other mechanical structures, and therefore the tool is accommodated in a state in which a phase of the tool is perpendicularly rotated.

On the other hand, a phase of the key block of the tool pocket and a phase of the key block of the spindle may form a right angle, and in this case, because the tool may not be exchanged by a general automatic tool changer, a tool carrier is used to rotate a phase of the tool.

The tool carrier of the related art will be described with reference to FIGS. 1 and 2.

A center shaft 12 is disposed at one side of a base plate 10, a swing unit 20 is rotatably installed at the center shaft 12, an actuator 30 is connected to one side of the swing unit 20 by the media of a link 32, and a carrier unit 40 is installed at the other side of the swing unit 20.

The aforementioned actuator 30 is driven by hydraulic pressure or pneumatic pressure so that a rod 31 extends/contracts, the aforementioned link 32 is connected to an end of the rod 31, and the actuator 30 is configured to be installed at one side of a machine tools frame 36 by a shaft pin 34 so that a posture of the actuator 30 may be rotated about the shaft pin 34.

Meanwhile, the aforementioned swing unit 20 turns by a drive of the aforementioned actuator 30, a section in which the swing unit 20 turns is from an original position A of the carrier unit 40 to a target position B of the carrier unit 40.

The aforementioned carrier unit 40 has a tool pocket unit 50 which is rotatably provided in a carrier body 44, and a rotating axis of the aforementioned tool pocket unit 50 is perpendicular to a rotating axis of the aforementioned swing unit 20.

Meanwhile, the aforementioned tool pocket unit 50 has a pin shaft 52 which is rotatably disposed in the aforementioned carrier body 44, and a pin 54 is installed to protrude at one side of the pin shaft 52.

In addition, first and second alignment grooves 52a and 52b are formed at the aforementioned pin shaft 52, the first and second alignment grooves 52a and 52b form 90° based on a center of the pin shaft 52, a ball stopper 58 is provided at one side of the carrier body 44, and the ball stopper 58 is inserted the first alignment groove 52a or the second alignment groove 52b to prevent the tool pocket unit 50 from being randomly moved after the rotation of the tool pocket unit 50 is completed.

In addition, a tool pocket 55 is formed at a front side of the tool pocket unit 50 to accommodate a tool T, and a key block 56 is disposed at one side of the tool pocket 55.

That is, as a key groove formed at the tool T and the aforementioned key block 56 are fitted with each other when the tool T is accommodated in the aforementioned tool pocket 55, the tool T is always aligned as a particular phase.

Meanwhile, a first pin guide unit 60a and a second pin guide unit 60b are installed at an upper side of the aforementioned base plate 10, the first pin guide unit 60a is installed at a position when the movement of the carrier unit 40 toward the tool magazine is completed, and the second pin guide unit 60b is installed at a position when the movement of the carrier unit 40 toward the spindle is completed.

In addition, the aforementioned first and second pin guide units 60a and 60b come into contact with the pin 54, as illustrated in FIG. 2.

Therefore, when the tool carrier 40 turns to return to the original position A, the pin 54 comes into contact with the first pin guide unit 60a at any moment, and when the tool carrier 40 further rotates, the pin 54 rotates the pin shaft 52 to turn a direction of the tool pocket unit 50.

In contrast, when the tool carrier 40 turns to the target position B, the pin 54 comes into contact with the second pin guide unit 60b at any moment, and when the tool carrier 40 further rotates, the pin 54 rotates the pin shaft 52 to turn a direction of the tool pocket unit 50.

That is, in the aforementioned tool pocket unit 50, phases of the pocket unit 50 and the tool T are changed according to whether the tool carrier 40 is positioned at the original position A or the target position B.

However, the aforementioned tool carrier of the related art has the following problems.

The tool T reciprocates to the original position A or the target position B in a state of being accommodated in the tool pocket unit 50, and as the tool T rotates from the moment when the pin 54 and the first and second pin guide units 60a and 60b come into contact with each other immediately before the tool T arrives at the target position, the phase of the tool T is changed.

However, there is a problem in that impact is generated at the moment when the pin 54 and the first and second pin guide units 60a and 60b come into contact with each other, as described above, and the tool T is moved away from the tool pocket unit 50 due to the impact.

Particularly, because a tool T provided for a special purpose is formed to be asymmetric with respect to a rotating axis, a center of gravity of the tool T is concentrated toward any one side, and the tool T may be in an unstable state when the tool T is accommodated in the tool pocket unit 50.

In addition, because a center of gravity of the tool having a large diameter, of which a diameter is large is also concentrated outward, the tool T may be in an unstable state when the tool T is accommodated in the tool pocket unit 50.

In a case of the special tool T of which a center of gravity is concentrated in one side, as describe above, there is a problem in that impact occurs when the pin 54 and first and second pin guide units 60a and 60b collide with each other at the time when the arrival at the original position A or the target position B is completed, and the tool T is moved away from the tool pocket 55 immediately after the impact.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

An object of the present disclosure is to provide a tool carrier for an automatic tool changer capable of preventing a tool from being moved away from a tool pocket unit when the tool is moved by allowing the tool to rotate on the way of being moved.

Technical problems of the present disclosure are not limited to the technical problems described above, and technical problems that are not described will be clearly understood by a person skilled in the art from the description below.

To achieve the above-mentioned object, a tool carrier for an automatic tool changer according to the present disclosure includes: a base plate at which a center shaft is installed; a carrier unit installed at the center shaft to turn around the center shaft; a rotating pocket unit installed at the carrier unit to rotate and having a pin installed to protrude outward; a first cam block installed at the base plate and configured to perform a cam action with the pin to allow the pocket unit to rotate when the carrier unit turns from an initial position to the target position; and a second cam block installed at the base plate and configured to perform a cam action with the pin to allow the pocket unit to rotate when the carrier unit turns from the target position to the initial position.

In addition, the first and second cam blocks may include first and second preceding sections configured to allow a rotating velocity of the pocket unit to uniformly precede when a cam action with the pin is performed; first and second following sections configured to allow the rotating velocity of the pocket unit to uniformly follow when the cam action with the pin is performed; and first and second middle sections disposed between the first and second preceding sections and the first and second following sections and configured to allow the rotating velocity of the pocket unit to be uniform.

In addition, the first and second preceding sections and the first and second following sections may have a linear shape, and the first and second middle sections may have a curved shape.

Details of other exemplary embodiments are included in the detailed description and the drawings.

In the tool carrier for an automatic tool changer according to the present disclosure, which is configured as described above, the tool pocket unit rotates while moving between the initial position and the target position, and therefore a state in which the tool is stably accommodated in the tool pocket unit may be maintained without impact as in the related art which causes a tool to rotate at any particular moment.

DESCRIPTION OF MAIN REFERENCE NUMERALS OF DRAWINGS

Figure 1:
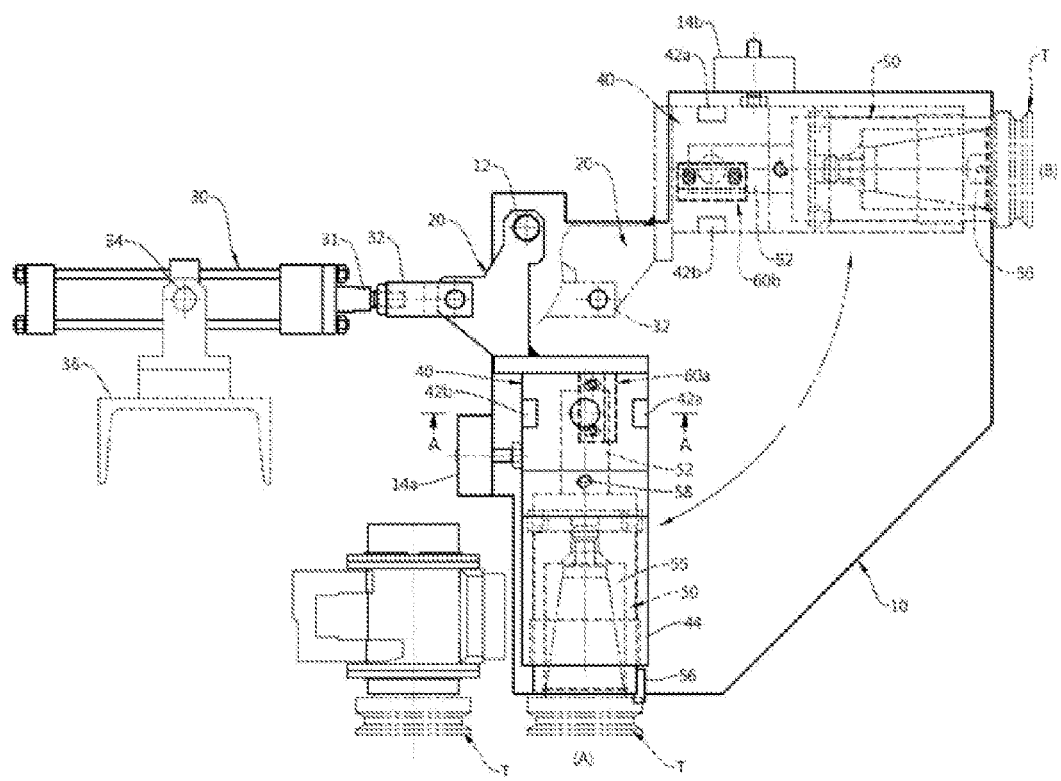
FIG. 1 is a view for explaining a tool carrier for an automatic tool changer of the related art.
Figure 2:
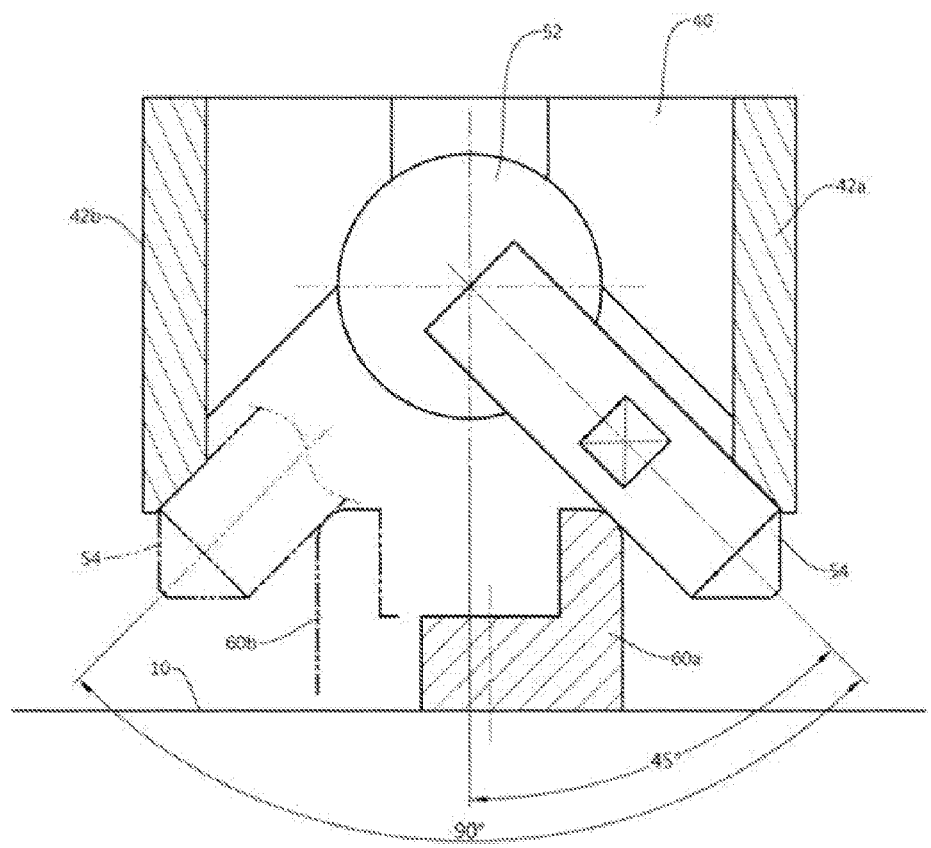
FIG. 2 is a cross-sectional view taken along line A-A of FIG. 1.

10: Base plate
12: Center shaft
14a, 14b: First and second stopper units
16a, 16b: First and second carrier detection units
20: Swing unit
30: Actuator
32: Link
40: Carrier unit
42a, 42b: First and second guide units
44: Carrier body
50: Pocket unit
52: Pin shaft
52a, 52b: First and second alignment grooves
54: Pin
56: Key block
58: Ball stopper
60a, 60b: First and second pin guide units
100: Base plate
110: Hole
200, 300: First and second cam blocks
210, 310: First and second preceding sections
220, 320: First and second middle sections
230, 330: First and second following sections
400, 402: First and second brackets
410: Tool detection unit

DETAILED DESCRIPTION

The advantages and characteristics of the present disclosure and methods for achieving the same will become clear from the exemplary embodiments set forth in detail below with reference to the attached drawings.

Like reference numerals represent like elements throughout the specification. Those elements that are the same as the elements of the related art will carry the same reference numerals, and a detailed description thereof will be omitted.

Hereinafter, a tool carrier for an automatic tool changer according to an exemplary embodiment of the present disclosure will be described with reference to FIGS. 3 and 4.

Figure 3:
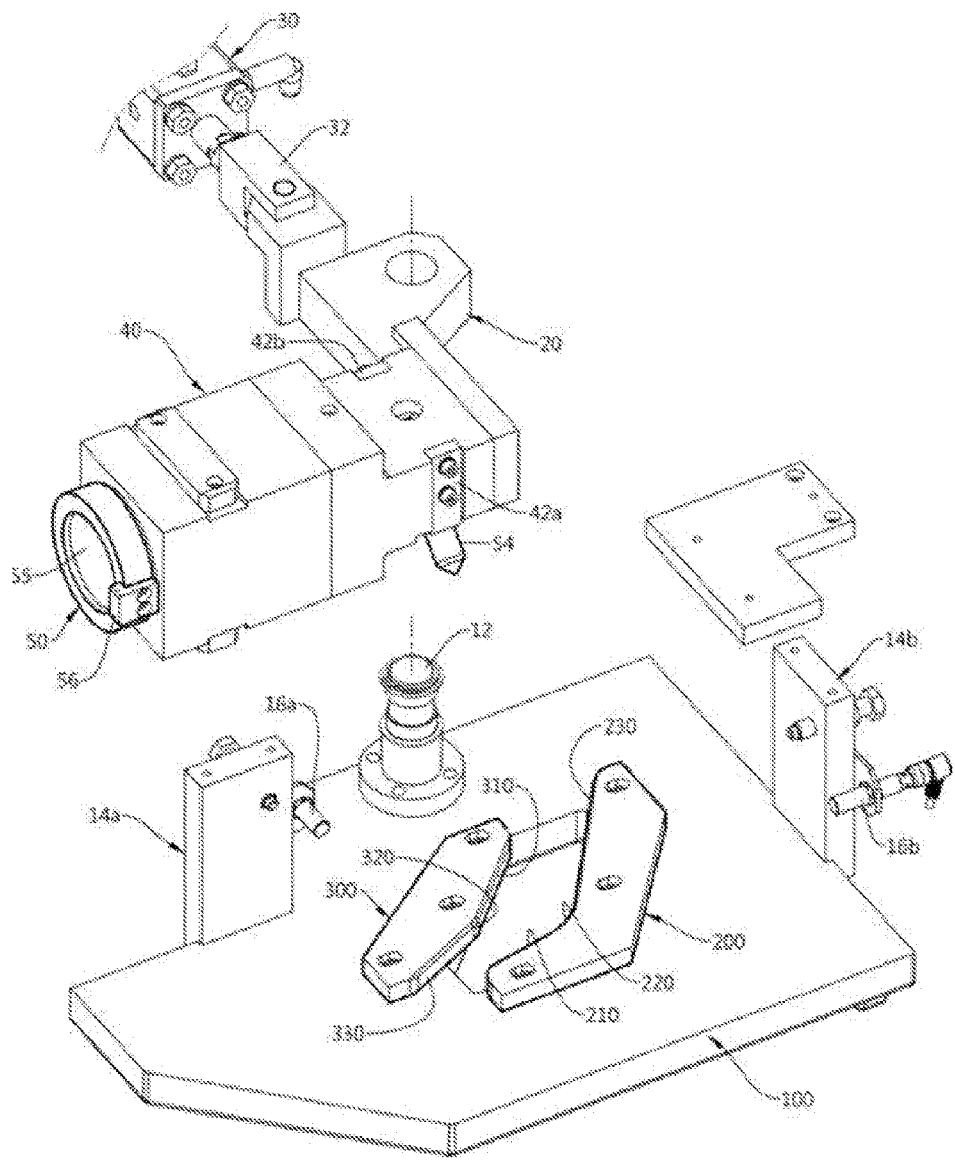
FIGS. 3 and 4 are exploded perspective views for explaining a tool carrier for an automatic tool changer according to an exemplary embodiment of the present disclosure.
Figure 4:
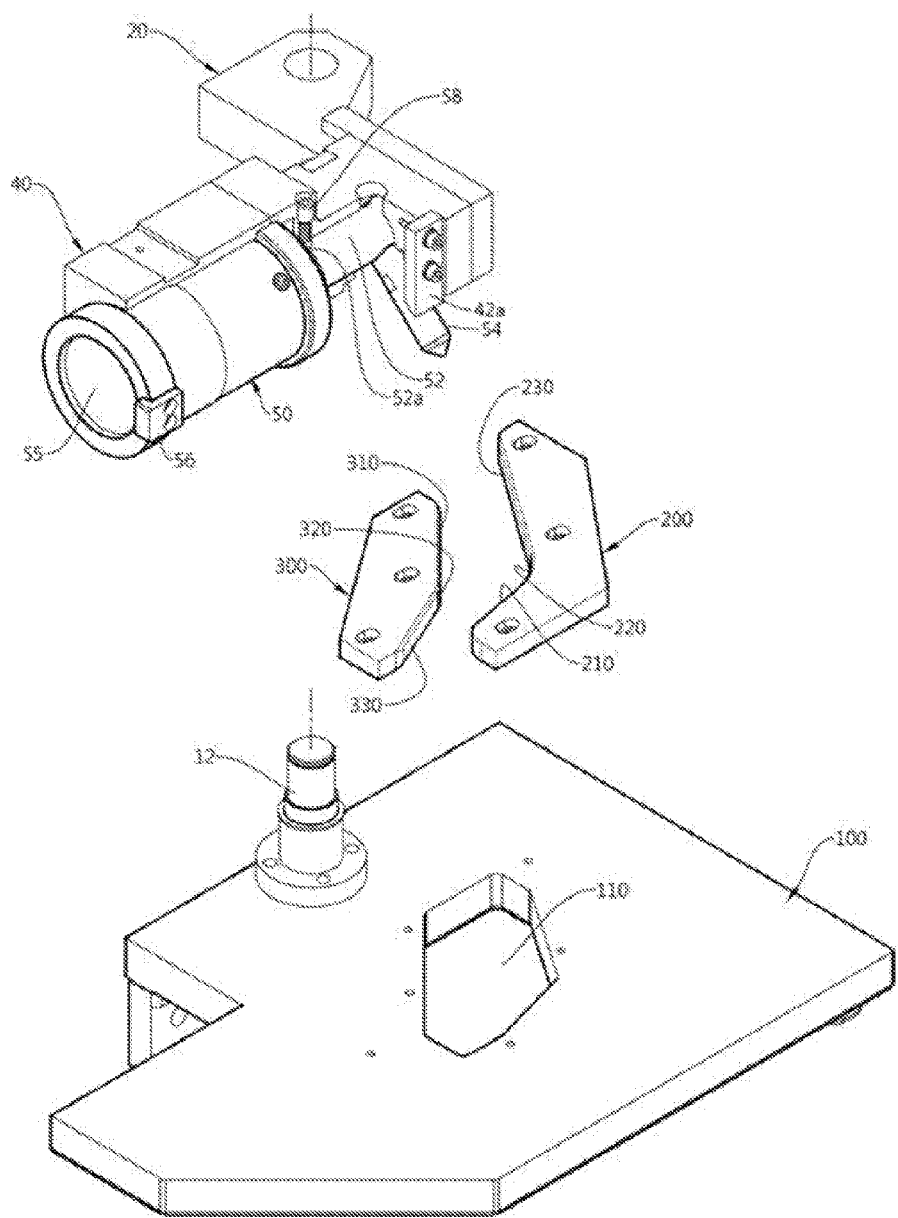

FIGS. 3 and 4 are exploded perspective views for explaining the tool carrier for an automatic tool changer according to an exemplary embodiment of the present disclosure.

As illustrated in FIGS. 3 and 4, an interference prevention hole 110 is formed at a base plate 100, and first and second cam blocks 200 and 300 are installed in a path, through which a pin 54 of a carrier unit 40 is moved, to be spaced apart from each other.

The aforementioned first cam block 200 performs a cam action with the pin 54 of a pocket unit 50 when the carrier unit 40 moves from an original position A to a target position B, and the aforementioned second cam block 300 performs a cam action with the pin 54 of the pocket unit 50 when the carrier unit 40 moves from the target position B to the original position A.

Meanwhile, the first and second cam blocks 200 and 300 include first and second preceding sections 210 and 310 where the pin 54 begins to come into contact with the first and second cam blocks 200 and 300, and first and second following sections 230 and 330 where the pin 54 comes out of contact with the first and second cam blocks 200 and 300.

In addition, the first and second preceding sections 210 and 310 and the first and second following sections 230 and 330 may have a linear shape, respectively, and first and second middle sections 220 and 320 may have a curved shape, respectively.

That is, surfaces of the aforementioned first and second cam blocks 200 and 300, with which the pin 54 comes into contact, may be entirely formed as curved surfaces, but since the first and second preceding sections 210 and 310 and the first and second following sections 230 and 330, which are partial sections, are formed in a linear shape, respectively, as described above, the first and second cam blocks 200 and 300 may be easily manufactured, manufacturing costs thereof may be reduced, and a rotating velocity of the aforementioned pocket unit 50 may be generally and uniformly maintained.

On the other hand, variations in distance from a center of a center shaft 12 at the aforementioned first and second preceding sections 210 and 310 may be different from those at the aforementioned first and second following sections 230 and 330, and in more detail, variations (d) in distance from the center of the center shaft 12 at the first and second following sections 230 and 330 may be greater than variations (c) in distance from the center of the center shaft 12 at the first and second preceding sections 210 and 310.

Therefore, the first and second preceding sections 210 and 310 allow the pocket unit 50 to rotate at a slow velocity while the first and second cam blocks 200 and 300 and the pin 54 perform a cam action, and the first and second following sections 230 and 330 allow the pocket unit 50 to rotate at a faster velocity while the first and second cam blocks 200 and 300 and the pin 54 perform a cam action.

Meanwhile, the first and second middle sections 220 and 320 may be further formed between the aforementioned first and second preceding sections 210 and 310 and the aforementioned first and second following sections 230 and 330, respectively, and the rotating velocity of the pocket unit 50 is uniformly maintained at the first and second middle sections 220 and 320.

Meanwhile, the aforementioned first and second cam blocks 200 and 300 are provided separately from the base plate 100, positions where the first and second cam blocks 200 and 300 are installed at the base plate 100 are minutely adjustable, and as a result, the cam action with the pin 54 may be more smoothly performed.

On the other hand, the aforementioned first and second cam blocks 200 and 300 are provided as a separate configuration, but the present disclosure is not limited thereto, and the first cam block 200 and the second cam block 300 may be provided as a single configuration, and as a result, there is a merit in that installation and handling of the cam block become convenient.

On the other hand, first and second stopper units 14a and 14b, which allow the carrier unit 40 to be stopped and aligned, may be installed at sides of the base plate 100, and first and second carrier detection units 16a and 16b, which detect the aforementioned carrier unit 40, may be installed at the aforementioned first and second stopper units 14a and 14b, respectively.

On the other hand, first and second brackets 400 and 402 may be further installed on upper sides of the aforementioned first and second stopper units 14a and 14b, respectively, and tool detection units 410, which detect a tool T, may be further installed at the aforementioned first and second brackets 400 and 402.

That is, the aforementioned first and second carrier detection units 16a and 16b detect whether the movement of the carrier unit 40 is normally completed, and the aforementioned tool detection units 410 detect whether the tool T is present to detect whether the tool T has been moved away.

Hereinafter, an operation of the tool carrier for an automatic tool changer according to the exemplary embodiment of the present disclosure will be described with reference to FIGS. 5 and 6.

Figure 5:
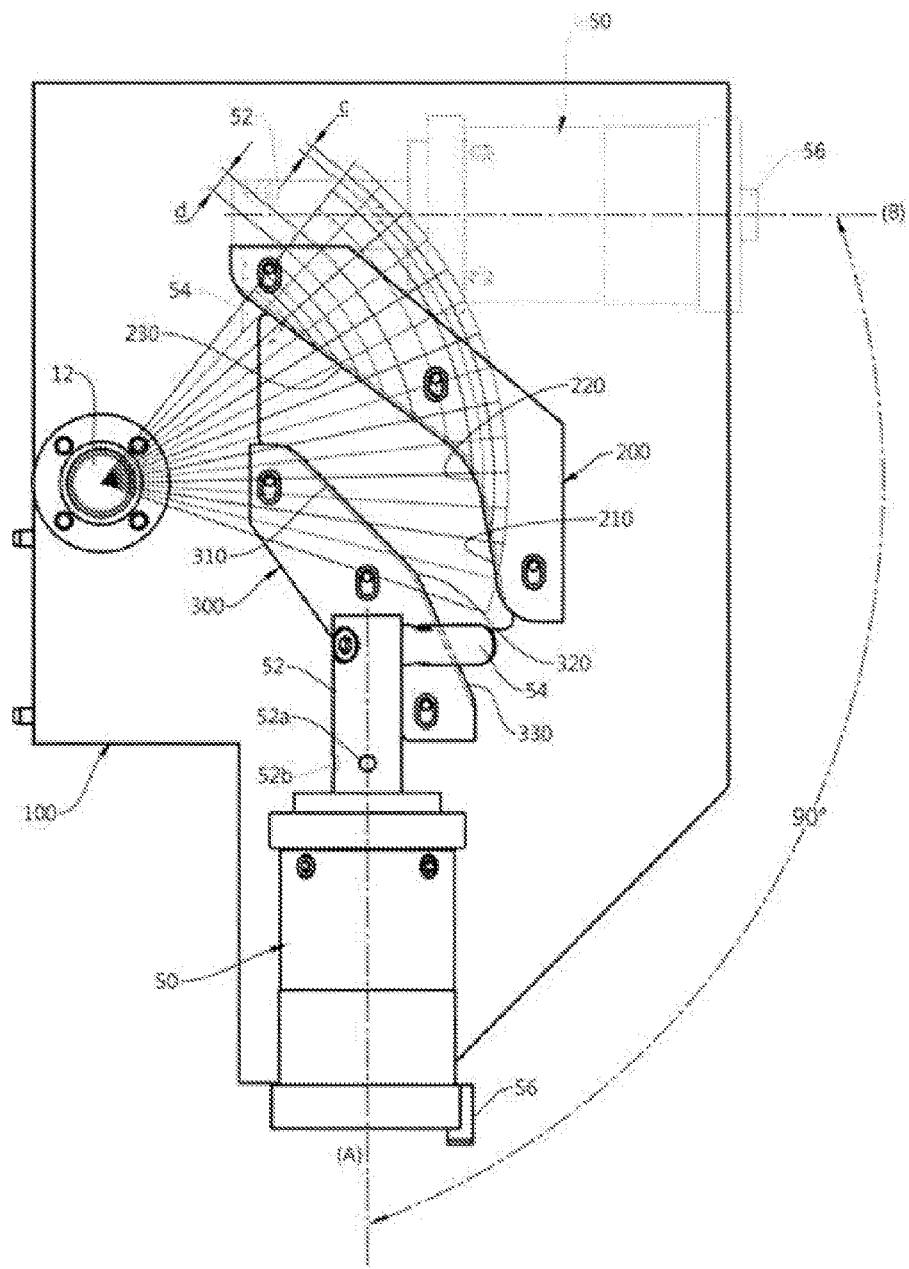
FIG. 5 is a plan view for explaining an operation of the tool carrier for an automatic tool changer according to the exemplary embodiment of the present disclosure.
Figure 6:
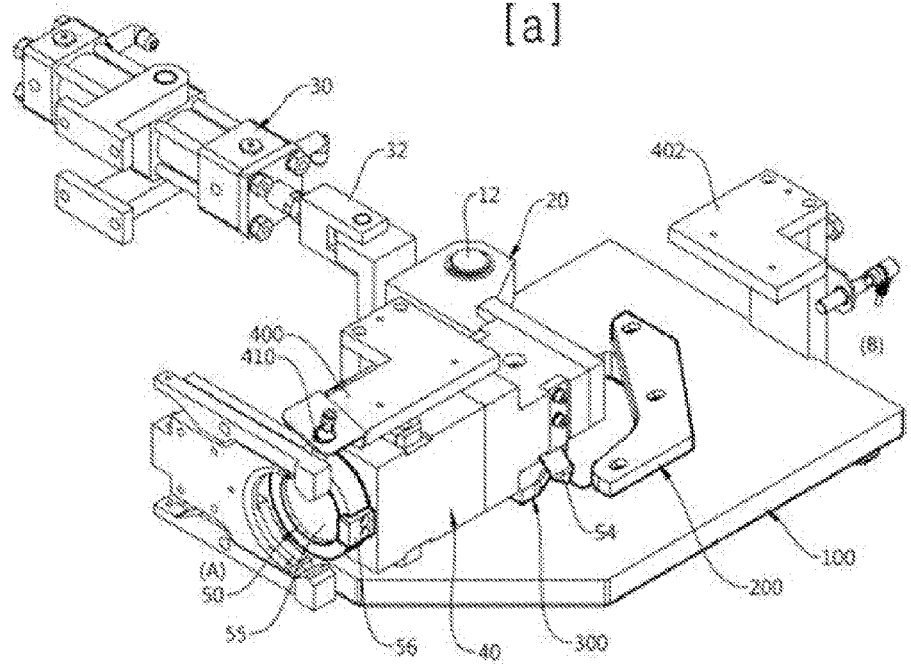
FIG. 6 is a view for explaining an operation of the tool carrier for an automatic tool changer according to the exemplary embodiment of the present disclosure, in which FIG. 6(*a*) illustrates a state in which a tool pocket unit is at an initial position, and FIG. 6(*b*) illustrates a state in which the tool pocket unit is at a target position.
Figure 6:
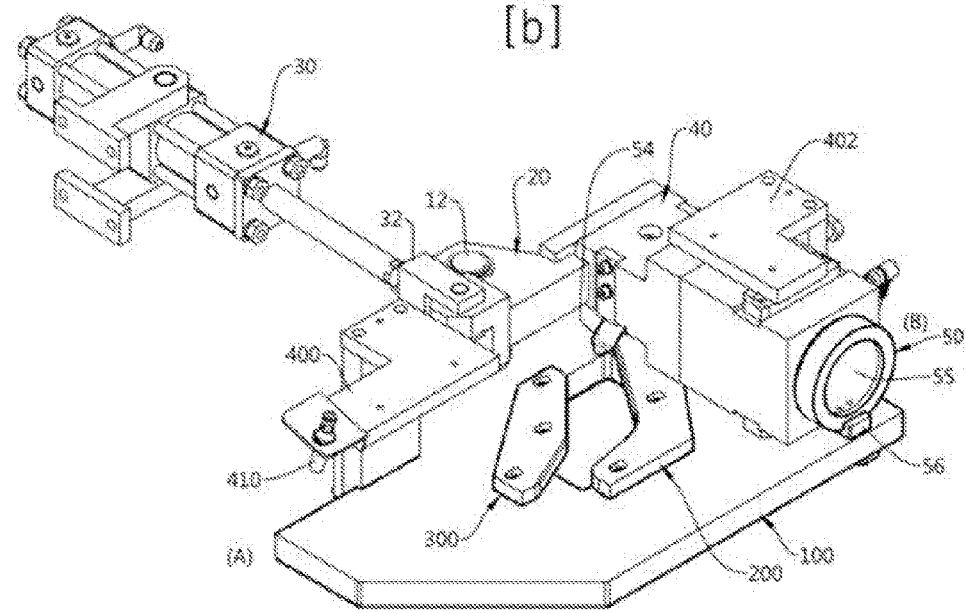

FIG. 5 is a plan view for explaining an operation of the tool carrier for an automatic tool changer according to the exemplary embodiment of the present disclosure, and FIG. 6 is a view for explaining an operation of the tool carrier for an automatic tool changer according to the exemplary embodiment of the present disclosure, in which FIG. 6(a) illustrates a state in which the tool pocket unit is at an initial position, and FIG. 6(b) illustrates a state in which the tool pocket unit is at a target position.

When an actuator unit 30 performs an extension operation or a contraction operation, the carrier unit 40 turns around the center shaft 12 within a range between the original position A and the target position B.

First, a state when the carrier unit 40 is positioned at the initial position A is a state in which a rod of the actuator 30 contracts and pulls a swing unit 20 so that the carrier unit 40 is positioned at the original position A.

In addition, the pocket unit 50 is disposed at the aforementioned carrier unit 40, and considering a phase of the pocket unit 50, a key block 56 is positioned at three o'clock direction with respect to an azimuth angle.

Thereafter, when the tool T is accommodated in the pocket unit 50 and the actuator 30 is operated, the swing unit 20 and the carrier unit 40 turn around the center shaft 12, and the pin 54 of the pocket unit 50 begins to perform a cam action with the first cam block 200.

While the rotation of the carrier unit 40 is performed, the pocket unit 50 rotates by the cam action between the pin 54 of the pocket unit 50 and the first cam block 200.

Particularly, the rotating velocity of the pocket unit 50 is generally and uniformly maintained while the pin 54 passes through the first preceding section 210 and the first following section 230.

Thereafter, as illustrated in FIG. 6(b), when the turning operation of the carrier unit 40 from the initial position A to the target position B is completed, the phase of the pocket unit 50 has been perpendicularly rotated, and considering the key block 56, it can be seen that an azimuth is at a six o'clock direction.

When the actuator 30 is reversely operated, the swing unit 20 and the carrier unit 40 return from the target position B to the initial position A, and the pin 54 performs a cam action with the second cam block 300 in this returning process.

That is, the pin 54 rotates the pocket unit 50 while passing through the second preceding section 310 and the second following section 330 of the second cam block 300, the tool T accommodated in the pocket unit 50 is stable without impact as the rotating velocity of the pocket unit 50 is uniformly maintained, and as a result, the tool T may be prevented from being randomly moved away when the tool T is moved while changing the phase thereof.

While the exemplary embodiments of the present disclosure have been described with reference to the accompanying drawings, those skilled in the art will appreciate that the present disclosure can be implemented in other detailed embodiments, without departing from the technical spirit and essential features of the disclosure.

Therefore, it should be understood that the above-described embodiments are only illustrative in all aspects, not restrictive. The scope of the present disclosure should be defined by the accompanying claims rather than the detailed description. Various modifications, additions, and substitutions derived from the meaning and scope of the accompanying claims and equivalent concept thereof should be interpreted as being included in the scope of the present disclosure.

The tool carrier for an automatic tool changer according to the present disclosure may be used to carry a tool while rotating a phase of the tool.

Although the present disclosure has been described with reference to exemplary and preferred embodiments, workers skilled in the art will recognize that changes may be made in form and detail without departing from the spirit and scope of the disclosure.

The invention claimed is:

1. A tool carrier for an automatic tool changer, comprising:
    a base plate at which a center shaft is installed;
    a carrier unit installed at the center shaft to turn around the center shaft;
    a rotating pocket unit installed at the carrier unit to rotate and having a pin installed to protrude outward;
    a first cam block installed at the base plate and configured to perform a cam action with the pin to allow the pocket unit to rotate when the carrier unit turns from an initial position to a target position; and
    a second cam block installed at the base plate and configured to perform a cam action with the pin to allow the pocket unit to rotate when the carrier unit turns from the target position to the initial position.

2. The tool carrier for an automatic tool changer of claim 1, wherein
    the first and second cam blocks include:
    first and second preceding sections configured to allow a rotating velocity of the pocket unit to uniformly decrease when the cam actions with the pin are performed;
    first and second following sections configured to allow the rotating velocity of the pocket unit to uniformly increase when the cam actions with the pin are performed; and
    first and second middle sections disposed between the first and second preceding sections and the first and second following sections to allow the rotating velocity of the pocket unit to be uniform.

3. The tool carrier for an automatic tool changer of claim 2, wherein the first and second preceding sections and the first and second following sections have a linear shape, and the first and second middle sections have a curved shape.

* * * * *